Nov. 5, 1929.  O. SEVERSON  1,734,502
TOOL HOLDER WITH TOP LOCK
Filed March 25, 1927
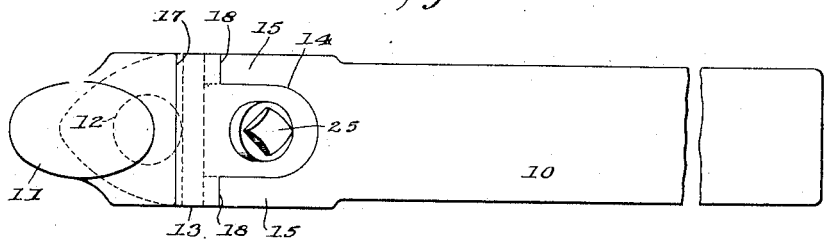
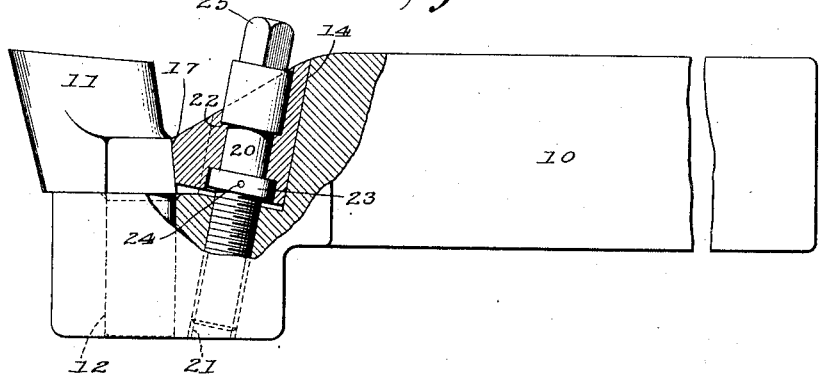
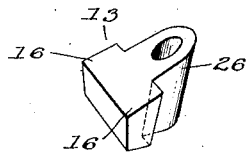
Inventor
Ole Severson
By Attorney
Nathan & Bowman Patented Nov. 5, 1929

1,734,502

UNITED STATES PATENT OFFICE

OLE SEVERSON, OF SHELTON, CONNECTICUT, ASSIGNOR TO THE O. K. TOOL COMPANY, INC., OF NEW YORK, N. Y., A CORPORATION OF NEW YORK

TOOL HOLDER WITH TOP LOCK

Application filed March 25, 1927. Serial No. 178,184.

This invention relates to cutting tools and particularly to that type of cutting tools which are commonly made in two parts, comprising a holder and the tool proper fastened thereon. The holder serves the purpose of supporting the tool on a lathe, boring machine, milling machine cutter, or any of the various places in which a cutting tool is applied.

The development of new alloys and harder metals of various types and the increased speed at which cutting operations are made, has made it necessary that cutting tools be made of extreme hardness and have various characteristics whereby they are able to withstand the high temperatures and extremely high forces to which they are subjected. The above qualities are those which are particularly required of the portion of the tool in immediate contact with the work to be operated upon. The other portions of the tool, on the other hand, while not requiring to be of such extreme hardness must have certain other qualities, such as toughness, and strength and are accordingly made usually of what is known as "mild steel" and which is ordinarily less expensive than the cutting tool proper supported thereon, the latter being ordinarily made of "high speed steel" or an alloy which is more expensive than the metal of which the holder may be made.

The operation of a machine tool is to a very large extent dependent upon the qualities of the cutting tool and as a consequence thereof any improvements in the cutting tool however slight they may appear to be which will better enable them to withstand the strains to which they are subjected and which will enable the machine to be operated at a higher speed and with greater efficiency are of prime importance in the efficiency of the machine as a whole.

As a result of the vast amount of study devoted to improving cutting tools many important changes have been conceived and outstanding among these is the above mentioned idea of making the cutting tool in two parts. This not only enables the cutting tools to be made more cheaply and of better materials corresponding to the functions which the various parts must be designed for but also enables the portion subjected to the wear and re-grinding operations to be replaced by new cutting tools of like shape and also of replacing such tools by others adapted for any of the special types of work to which a cutting tool is ordinarily applied.

Owing to the high stresses to which these cutting tools are subjected the cutting tool proper must be very rigidly supported on the holder and among the devices discovered for performing such function has been the idea of providing the tool with a shank adapted to be inserted in an opening on the holder and being locked in such position by a wedge member bearing against complemental wedging surfaces on the holder and cutting tool proper.

The objects of this invention are concerned particularly with improved means for locking a cutting tool on a holder and provides novel means for wedging said tools on the holder. The objects particularly include means in combination with such wedging devices for providing an increased bearing area against which the cutting tool is supported.

The objects of the invention also include the provision of means acting at a greater distance from the point of support of the tool whereby the resisting surfaces or abutments against which the cutting tool is supported act at the end of a comparatively long arm and the forces which are exerted upon the tool holder are primarily compression forces rather than twisting or torsional forces.

In previous devices of this type screw threaded means have been provided for adjusting the wedge member into engagement with the cutting tool and holder and it is one of the specific objects of this invention to provide means for relieving this adjusting screw of many of the forces to which it has heretofore been subjected.

The objects of this invention on the whole are to provide in a cutting tool having a removable point a construction which is more compact and rigid and therefore results in increased efficiency of the tool and more accurate machining operations.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a view in elevation of a cutting tool to which this invention is adapted with certain portions shown in section. Fig. 2 is a plan view of the same tool and looking down thereon and Fig. 3 is a detail view in perspective of the wedge-shaped locking member.

The tool disclosed herein comprises primarily a holder or body member 10 adapted to support at its outer end the cutter tool proper 11. Outward movement of the cutter tool is firmly and positively resisted by interengaging means between the holder and cutter tool exemplified in the specific construction shown by a shank 12 projecting from the cutter tool and engaging in an opening in the outer end of the holder. This interengaging means in conjunction with abutment means for resisting movement in the other direction and an interposed wedge-shaped member 13 shown in Fig. 3 having a portion operative in the recess 14 form a construction for securely and rigidly locking the cutter tool in the holder.

The recess 14 leaves on either side thereof longitudinal projecting portions 15 extending in an outward direction from the holder; these portions 15 being adapted to act as abutments to receive the force acting on the cutting tool. As may be seen the outward ends of the abutments 15 are spaced from the inner surface of the cutting tool thereby leaving openings for the reception of projecting ears 16 of the locking member 13; the locking member 13 being substantially T-shaped in horizontal section. The inner wall 17 of the cutting tool and the outer walls 18 of the opposed ends of the abutments 15 are inclined with respect to each other so that the openings left are wedge shaped and the portion of the locking member 13 is of a corresponding shape whereby upon the forcing of the locking member 13 into such opening the cutting tool is securely wedged and locked upon the holder.

Means are provided for securely drawing this locking member into engagement with the complemental inclined surfaces comprising a screw 20 adapted to screw into the threaded opening 21 of the holder. A shoulder 22 of the screw engages a corresponding shoulder of the locking member for forcing the locking member into the wedge-shaped opening. A collar 23 is fastened by means of pin 24 on the bolt 20 whereby reverse rotation of the screw will withdraw the wedge-shaped locking member. A squared end 25 is provided on the screw for application of a wrench thereto. The surface 14 is substantially parallel to the axis of the opening 21 in the holder whereby the portion 26 of the locking member in adjustment thereof moves parallel to the wall 14. The particular incline of the walls 17 and 18 may be varied as desired so long as the result is a wedge-shaped opening.

By the means shown it is apparent that the forces acting on the cutting tool 11 are transferred primarily to the abutments 15 which may be made of such dimensions as desired. It may be seen therefore that the screw 20 is relieved of the force acting on the tool and that the tool has a much larger area for the support thereof.

It is to be noted that the forces acting on a cutting tool of the type shown herein are not only those acting in a direction longitudinally of the axis of the holder but also include forces which act at an angle thereto and may in fact be at right angles thereto whereby the cutting tool is subjected to forces tending to rotate it on the supporting axis formed by the shank 12. The means shown herein provide very substantial and rigid means for absorbing such forces. The supporting abutments 15 act substantially perpendicular to a line drawn radially from the center of the shank 12 and these abutments also, as may be noticed, are placed at a relatively large distance from the shank 12, and therefore act with a greater lever-arm to resist the force acting at the outer end of the cutter tool 11.

It is evident from the above operation that the portion 26 is relieved of the major forces which would act thereon if such forces were not otherwise provided for by the abutments 15 acting through the ears 16 of the locking member. No twisting action of the member 26 takes place which might tend to spread the abutments 15 and weaken thereby possibly the rigidity of the tool.

The novel means disclosed herein result in a very rigid compact cutting tool practically free from vibration and chatter and one which is practically equal, in so far as rigidity is concerned, of a solid tool made in one piece but which at the same time has all the advantages accompanying a cutting tool made with a holder and detachable cutting point.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of the United States:—

1. In a cutting tool, a bar-shaped tool holder, having an opening in the outer end thereof and a recess extending inwardly from the outer end, the sides of said recess extending outwardly to form abutments; a tool having a shank mounted in said opening and said tool having a bearing surface on the inner side thereof; and a locking member adjustably mounted in said recess and having wedge-shaped portions extending between said bearing surface and said abutments, said bearing surfaces being arranged to prevent turning of said tool about its shank.

2. In a cuttting tool, an elongated lathe-type holder having an opening in the outer end thereof; projecting abutments at the outer end of said tool forming a recess therebetween; a tool having a shank mounted in said opening and having plane bearing surfaces arranged opposite said abutments; a locking member adjustably mounted in said recess; and wedging means movable with said member and arranged between said bearing surfaces and said abutments whereby adjustment of said member causes said wedging means to securely lock said tool in position and prevents twisting thereof about its shank.

3. A cutting tool having a bar-shaped holder and a tool removably mounted at the outer end thereof combining, abutments on said holder projecting longitudinally at the outer end and forming a recess therebetween; a projection on said tool adapted to be inserted in an opening in said holder for supporting said tool thereon, said tool having a plane bearing surface arranged adjacent the ends of said abutments and forming a tapered opening therebetween; a member adjustably mounted in said recess and having a wedge-shaped portion adapted to engage in said tapered opening whereby said tool is rigidly locked on said holder.

4. In a cutting tool, a bar-shaped holder having an opening at the outer end thereof and longitudinally arranged abutments projecting adjacent to said opening and forming a recess between said abutments; a tool having a shank thereon mounted in said opening and having a bearing surface arranged opposite the outer ends of said abutments and forming tapered openings therebetween; a member slidably mounted in said recess and having tapered portions arranged in said tapered openings; and screw threaded means for adjusting said member whereby said tapered portions act as wedges to securely lock said tool against said abutments and prevent turning thereof.

5. A cutting tool combining a bar-shaped holder; spaced outwardly projecting abutments forming a recess therebetween; a cuting member mounted on the outer end of said holder having bearing surfaces arranged oppositely to but spaced from said abutments; inter-engaging means between said holder and member to prevent outward movement of the latter; and a locking member adjustably mounted in said recess and having wedge-shaped portions extending between said abutments and the respective oppositely arranged bearing surfaces whereby said cutting member is securely locked on said holder and turning about said interengaging means is prevented.

6. A cutting tool combining a bar-shaped holder; spaced abutments thereon forming a recess therebetween; a cutting member arranged on said holder adjacent to but spaced from the outer faces of said abutments; a wedging member mounted in said recess and having portions fitting in the openings between said abutments and the adjacent face of the cutting member; means for adjusting said wedging member in a direction substantially parallel to the outer faces of said abutments the faces of the wedging member and cutting member adjacent each other both being plane surfaces and inclined to the outer faces of said abutments to form a wedging means; and inter-engaging means between said holder and cutting member to prevent movement of the latter as the wedging member is adjusted into position.

7. A cutting tool combining a bar-shaped holder having an opening at the outer end thereof; spaced outwardly facing abutments on said holder adjacent said opening forming a recess between the abutments; a cutting member having a shank mounted in said opening and bearing surfaces arranged oppositely to said abutments said bearing surfaces being flat and inclined to the forward faces of said abutments and to the rear wall of said recess; a locking member mounted in said recess and having wedge portions extending between the abutments and the adjacent bearing surfaces; and means for adjusting said locking member in a direction substantially parallel to the rear face of said recess and the forward faces of said abutments.

In witness whereof, I have hereunto subscribed my name.

OLE SEVERSON.